United States Patent
Greig

(10) Patent No.: US 8,224,023 B2
(45) Date of Patent: Jul. 17, 2012

(54) METHOD OF TRACKING AN OBJECT IN A VIDEO STREAM

(75) Inventor: Darryl Greig, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1152 days.

(21) Appl. No.: 11/490,156

(22) Filed: Jul. 21, 2006

(65) Prior Publication Data

US 2007/0097112 A1 May 3, 2007

(30) Foreign Application Priority Data

Oct. 31, 2005 (GB) .................................. 0522225.2

(51) Int. Cl.
G06K 9/00 (2006.01)

(52) U.S. Cl. ......................... 382/103; 382/100; 348/169

(58) Field of Classification Search .................... None
See application file for complete search history.

(56) References Cited

U.S. PATENT DOCUMENTS

| | | | | |
|---|---|---|---|---|
| 4,692,801 A * | 9/1987 | Ninomiya et al. | ........ | 375/240.21 |
| 4,853,968 A * | 8/1989 | Berkin | ........................... | 382/151 |
| 4,873,573 A * | 10/1989 | Thomas et al. | .......... | 375/240.16 |
| 5,150,207 A * | 9/1992 | Someya | ................... | 375/240.21 |
| 5,247,353 A * | 9/1993 | Cho et al. | ................... | 348/431.1 |
| 5,359,426 A * | 10/1994 | Honda et al. | .................. | 386/269 |
| 5,611,000 A * | 3/1997 | Szeliski et al. | ............... | 382/294 |
| 5,617,482 A * | 4/1997 | Brusewitz | ..................... | 382/107 |
| 5,691,769 A * | 11/1997 | Kim | .......................... | 375/240.18 |
| 5,892,849 A * | 4/1999 | Chun et al. | ..................... | 382/236 |
| 5,910,909 A * | 6/1999 | Purcell et al. | ................. | 708/322 |
| 5,917,953 A * | 6/1999 | Ausbeck, Jr. | .................. | 382/239 |
| 6,009,437 A | 12/1999 | Jacobs | | |
| 6,064,749 A * | 5/2000 | Hirota et al. | .................. | 382/103 |
| 6,215,890 B1 * | 4/2001 | Matsuo et al. | ................ | 382/103 |
| 6,278,803 B1 * | 8/2001 | Ohashi | ......................... | 382/254 |
| 6,289,050 B1 * | 9/2001 | Ohtani et al. | ............ | 375/240.16 |
| 6,456,340 B1 * | 9/2002 | Margulis | ....................... | 348/745 |
| 6,480,615 B1 * | 11/2002 | Sun et al. | ...................... | 382/103 |
| 6,546,117 B1 * | 4/2003 | Sun et al. | ...................... | 382/103 |
| 6,671,321 B1 * | 12/2003 | Ohtani et al. | ............ | 375/240.16 |
| 6,760,465 B2 * | 7/2004 | McVeigh et al. | .............. | 382/103 |
| 6,782,132 B1 * | 8/2004 | Fogg | ............................. | 382/232 |
| 7,133,453 B2 * | 11/2006 | Arita et al. | ............... | 375/240.16 |
| 7,433,497 B2 * | 10/2008 | Chen | ............................. | 382/107 |
| 7,440,587 B1 * | 10/2008 | Bourdev | ....................... | 382/103 |
| 7,473,495 B2 * | 1/2009 | Tanaka et al. | ..................... | 430/5 |
| 7,522,748 B2 * | 4/2009 | Kondo et al. | ................. | 382/107 |
| 7,616,780 B2 * | 11/2009 | Bourdev | ....................... | 382/103 |

(Continued)

FOREIGN PATENT DOCUMENTS

EP 0955605 A1 5/1998

Primary Examiner — Chan S Park
Assistant Examiner — Avinash J Yentrapati

(57) ABSTRACT

A method of tracking an object such as a face in a video stream comprises running an object detector at a plurality of locations on a first frame, defining a coarse grid. This is repeated for second and subsequent frames, with the grid slightly offset each time so that, ultimately, all of the points on a fine grid are covered but in several passes. When an object such as a face is located on one frame, positional and/or scale information is propagated to the next frame to assist in the tracking of that object onto the next frame.

19 Claims, 3 Drawing Sheets

U.S. PATENT DOCUMENTS

| | | | |
|---|---|---|---|
| 7,817,717 B2* | 10/2010 | Malayath et al. | 375/240.16 |
| 7,885,329 B2* | 2/2011 | Nakamura et al. | 375/240.16 |
| 2002/0114525 A1* | 8/2002 | Bolle et al. | 382/232 |
| 2002/0141615 A1* | 10/2002 | Mcveigh et al. | 382/103 |
| 2002/0159749 A1* | 10/2002 | Kobilansky | 386/1 |
| 2002/0167537 A1 | 11/2002 | Trajkovic | |
| 2003/0053661 A1* | 3/2003 | Magarey | 382/103 |
| 2003/0067988 A1* | 4/2003 | Kim et al. | 375/240.17 |
| 2003/0198385 A1* | 10/2003 | Tanner et al. | 382/195 |
| 2003/0227552 A1* | 12/2003 | Watanabe | 348/220.1 |
| 2004/0186816 A1* | 9/2004 | Lienhart et al. | 706/20 |
| 2005/0069037 A1* | 3/2005 | Jiang | 375/240.16 |
| 2005/0089196 A1* | 4/2005 | Gu et al. | 382/107 |
| 2005/0089768 A1* | 4/2005 | Tanaka et al. | 430/5 |
| 2005/0117804 A1* | 6/2005 | Ida et al. | 382/199 |
| 2005/0286637 A1* | 12/2005 | Nakamura et al. | 375/240.16 |
| 2006/0140446 A1* | 6/2006 | Luo et al. | 382/104 |
| 2007/0047834 A1* | 3/2007 | Connell | 382/274 |
| 2007/0097112 A1* | 5/2007 | Greig | 345/419 |
| 2007/0279494 A1* | 12/2007 | Aman et al. | 348/169 |

* cited by examiner

METHOD OF TRACKING AN OBJECT IN A VIDEO STREAM

RELATED APPLICATIONS

The present application is based on, and claims priority from, British Application Number 0522225.2, filed Oct. 31, 2005, the disclosure of which is hereby incorporated by reference herein in its entirety.

FIELD

The present invention relates to a method of tracking and/or deleting an object in a video stream, and particularly although not exclusively to a method capable of operating on a real-time video stream in conjunction with a sub-real-time object detector.

In recent years, algorithms designed to detect faces or other objects within a video stream have become much more efficient, to the extent that some are now capable of operating in real-time or near real-time when run on a powerful platform such as a PC. However, there is now an increasing demand for face and object detection to be provided on low powered platforms such as hand-held organisers, mobile telephones, still digital cameras, and digital camcorders. These platforms are typically not sufficiently high powered to allow real-time operation using some of the better and more robust face/object detectors. There is accordingly a need to speed up object detection/tracking.

There have of course been many advances in recent years designated to speed up an object detection. Most of these operate on a frame-by-frame basis. That is, speedup is achieved by designing a faster frame-wise detector. In some cases, detectors are specifically designed for operation on a video stream, in which case some amount of historical information may be propagated to the current frame of interest. This may be done for reasons of speedup, robustness, or sometimes both.

Some examples of object detection and tracking algorithms designed specifically for a video stream are described below. Note that each of these methods presume the existence of a face/object detector that can operate on a single frame. The detector is generally assumed to give accurate results that may be enhanced or verified by historical data.

US Patent US20040186816 A1.—This is an example of a combined detection/classification algorithm, utilized for mouth tracking in this case. The inventors use a face detector initially to locate the face and mouth, then track the mouth using a linear Kalman filter, with the mouth location and state verified by a mouth detector in each frame. If the mouth is lost in any frame, the face detector is re-run and the mouth location re-initialized.

Keith Anderson & Peter McOwan. "*Robust real-time face tracker for cluttered environments*", Computer Vision and Image Understanding 95 (2004), pp 184-200.—The authors describe a face detection and tracking system that uses a number of different methods to determine a probability map for face locations in an initial frame of the video sequence. This probability map is then updated frame by frame using the same detection methods, so that in any given frame the recent history is included in the probability map. This has the effect of making the system more robust.

R. Choudhury Verma, C. Schmid, K. Mikolajczyk, "*Face Detection and Tracking in a Video by Propagating Detection Probabilities*", IEEE Trans on Pattern Analysis and Machine Intelligence, Vol. 25, No. 10 pp 1215-1228, 2003.—The authors describe a face detection and tracking system similar to the previous two mentioned. Faces are detected in each frame, and a probability map of face locations in the video stream is updated using the CONDENSATION algorithm. This algorithm is described in Isard & Blake, "*Condensation—Conditional Density Propagation for Video Tracking*", Int. J. Computer Vision, Vol. 29, 1998, pp 5-28.

DESCRIPTION OF EMBODIMENTS

Figure 1:
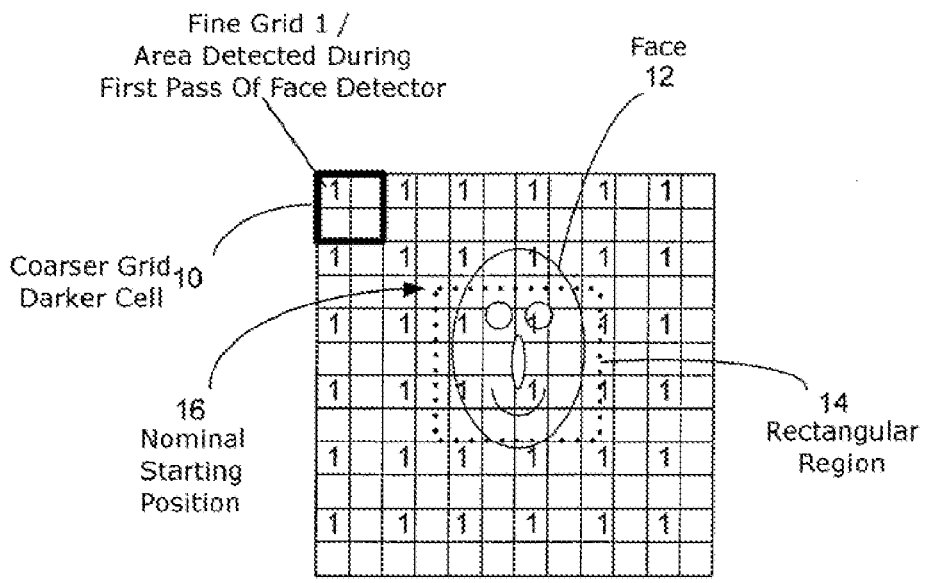
FIGS. 1 to 3 illustrate repeated passes across an image within which one or more faces are to be detected.

According to a first aspect of the present invention there is provided a method of tracking an object in a video stream comprising:

(a) running an object detector at a plurality of sampling locations, the locations defining a first grid spaced across a first frame, and recording a hit at each location where an object of interest is found; and (b) running the object detector at a further plurality of sampling locations defining a second grid spaced across a second frame, the second grid being offset from the first grid, and running the detector in addition at one or more further locations on the second frame derived from the or each location on the first frame at which a hit was recorded.

The invention further extends to a computer program for operating such a method, and to a computer readable medium bearing such a computer program.

According to a second aspect of the invention there is provide an apparatus for tracking an object in a video stream comprising a plurality of video frames, the apparatus including an object detector comprising a programmed computer for:

(a) running an object detector at a plurality of sampling locations, the locations defining a first grid spaced across a first frame, and recording a hit at each location where an object of interest is found; and (b) running the object detector at a further plurality of sampling locations defining a second grid spaced across a second frame, the second grid being offset from the first grid, and running the detector in addition at one or more further locations on the second frame derived from the or each location on the first frame at which a hit was recorded.

A particular feature of the present invention is that it may be used in conjunction with a variety of standard and well-understood face or object detection algorithms, including algorithms that operate sub-real-time.

Staggered sampling grids may easily be integrated into many existing detection and tracking system, allowing significant additional speed up in detection/tracking for a very small computational overhead. Since the preferred method applies only to the run-time operation, there is no need to retrain existing detectors, and well understood conventional object/face detectors may continue to be used.

It has been found that in some applications the use of a staggered grid may actually outperform the conventional fine grid (one pass) approach, both for false negative and for false positives. This is believed to be because the use of a local search, in some embodiments, allows attention to be directed at locations which do not occur even on a fine grid, thereby reducing the false negative rate. In addition, a coarse sampling grid is likely to locate fewer false positives, which are typically fairly brittle (that is, they occur only in specific locations), and those that are found are unlikely to be successfully propagated.

The invention may be carried into practice in a number of ways, and one specific embodiment will now be described, by way of example, with reference to the accompanying Figures.

In the present embodiment we wish to attempt real-time or near real-time face detection/tracking on a video stream, but using a face detector/tracker which operates only in sub-real-time.

Any convenient face or object detection/tracking algorithm may be used, including the following: Virma, Schmitd & Mikolajczyk, "*Face Detection & Tracking in a Video by Propagating Detection Probabilities*", IEEE Trans. On Pattern Analysis and Machine. Intelligence, Vol. 25, No. 10, October 2003. p 1215; Andersen & McOwan, "*Robust real-time face tracker for cluttered environments*", computer Vision and Image Understanding, 95 (2004), 184-200; and Isard & Blake, (op cit).

FIG. 1 shows the typical frame from a video stream including an image of a face 12. It will be assumed for the purposes of discussion that the chosen face detector, if run at all locations on the frame, will locate the face within a rectangular region 14 shown in dotted lines. It will be further assumed that the face detector operates in a rectangular region to the right of and below a nominal starting location 16. In other words, when the face detector is run at the location 16, it will carry out a search within the dotted region 14 to attempt to find a face.

In a practical embodiment, the face detector may actually operate at a plurality of different scales and may attempt to find a face at a variety of different sizes/resolutions to the right of and below the nominal starting position 16. Thus, the dotted rectangle 14, within which the face 12 is located, may be of a variety of differing sizes depending upon the details of the image being analysed and the details of the face detector. For the purpose of simplicity, however, the following description will assume that we are interested in detecting faces or other objects at a single resolution only. It will of course be understood that the method generalises trivially to operate at multiple resolutions.

If the face detector were to be capable of operating sufficiently rapidly, we could simply define a fine grid across the image, and run the face detector at every point on the grid, frame by frame. However, robust and reliable face detectors are computationally intensive, and it may not be possible for the detector to keep up with the incoming video stream if the detector is called at each and every point on a fine grid.

In the present embodiment, the detector is called not at each point of a fine grid but at each point of a larger 2×2 grid, as shown by the cells annotated with the numeral 1 in FIG. 1. For the purposes of this disclosure, it should be appreciated that the terms point and cell may be used interchangeably. The base unit for this coarser grid is shown schematically by the darker cell 10.

Figure 2:
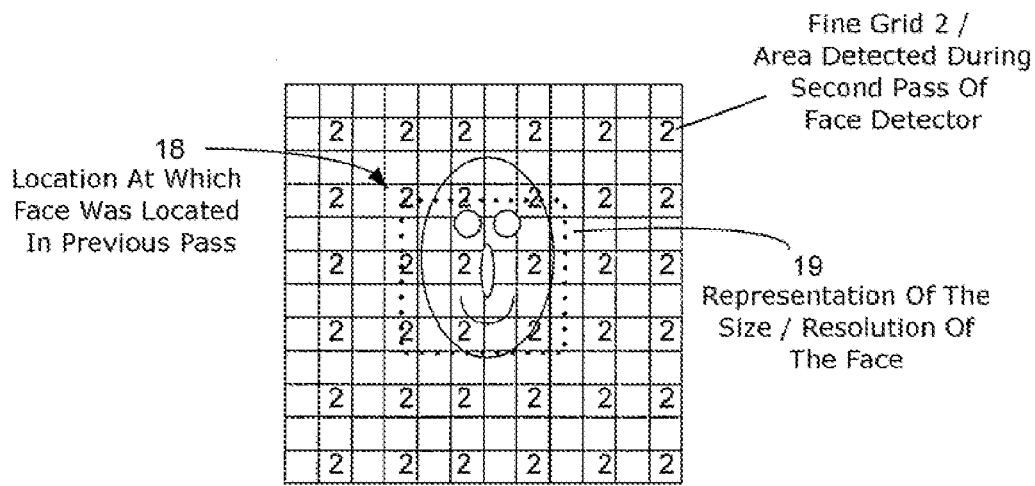
Figure 3:
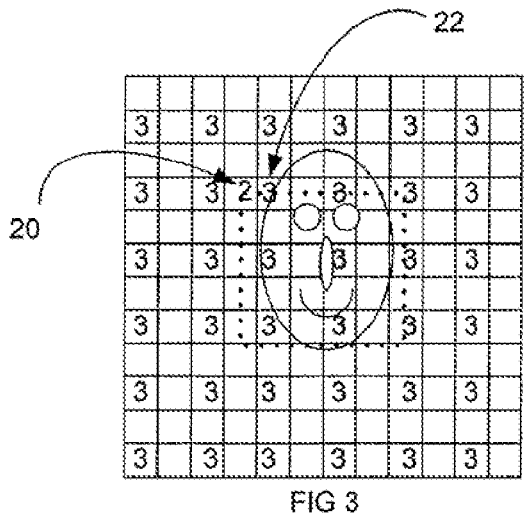

Once the first frame has been analysed, as shown in FIG. 1, a second pass is undertaken, as shown in FIG. 2, this pass being based on a grid which is offset from the first pass downwards and to the right by one cell of the finer grid. As shown in FIG. 3, a third pass is then undertaken based on a further grid which is offset by one cell to the left of the grid of FIG. 2. Finally, the system carries out a fourth pass (not shown), based upon a grid which is spaced diagonally upwards and to the right of the grid shown in FIG. 3. Accordingly, the entirety of the original finer grid has been covered, but in four sequential offset passes rather than in a single pass.

At any pass, if a face is located, the location and scale/size of the face is propagated to the next frame in order to assist detection and/or tracking of the face in that new frame.

In the example shown, the first pass of FIG. 1 misses the location 16 at which the face 12 may be found, and the face is therefore not located in that pass. In the second pass of FIG. 2, the face detector is triggered to operate at a location 18, corresponding to a location 16 of FIG. 1, and the face is therefore located. Details of the location 18 and a representation 19 of the size/resolution of the face is recorded for use in the next pass.

In the third pass, shown in FIG. 3, the face detector is triggered to operate at all of the locations indicated by the numeral 3. One of these locations 22 almost, but not quite, finds the face 12. In addition to the normal grid, however, on this pass the face detector is also triggered to run at the location 20, corresponding to the position 18 at which the face was located in the previous pass. Since in this example the face has not moved between frames, it is again automatically located in FIG. 3 by virtue of the information passed from the identification made in FIG. 2. Without that additional information, the face would not have been found in the FIG. 3 scan.

The propagation of information from 1 frame to a subsequent frame may take a variety of forms, including any or all of the following:

1. The position only is propagated, with the object being redetected anew in the next frame. The assumption being made here is that if the frame rate is sufficiently high the object is unlikely to have been moved very much between frames.
2. The position is propagated, and a local search is made in a neighbourhood of that position in the next frame to attempt to pick up the new position of the object. The search may be conducted either by running the full object detector at a plurality of locations around—the forward-propagated location, or alternatively a faster simpler algorithm may be used to undertake this pre-search, with the full object detection algorithm being used only at the most promising locations within the search area.
3. Some form of object tracking may be used to predict the location and/or scale of the object in the next frame, based upon measured changes of object location and/or scale between frames. This may be achieved by means of any suitable motion prediction algorithm (perhaps using motion vectors), for example a Kalman filter and/or the CONDENSATION algorithm of Isard & Blake, (op cit).

Preferably, the method is applied to consecutive sequential frames within the video stream, but given a sufficiently high frame rate the algorithm will still operate even if some frames (for example every other frame) are dropped.

It will of course be understood that the method may equally well be applied using coarse grids having a size other than 2×2, based upon the size of the fine grid which ultimately has to be covered.

If the desired sampling resolution (the cell size of the fine grid) is given by the variable "step" then a staggered algorithm based on a sampling resolution of twice that size may be generated as follows:

```
int i,j,idx,istart,jstart;
int nlocations=0;
```

```
POINT locations[MAX_LOCATIONS];
for ( idx=0; idx<4; ++idx ) {
    istart = jstart = 0;
    if ( idx == 1 ) {
        istart = step;
        jstart = step;
    } else if ( idx == 2 ) {
        jstart = step;
    } else if ( idx == 3 ) {
        istart = step;
    }
    for ( i=istart; i < img_height; i += 2*step ) {
        for ( j=jstart; j < img_width; j += 2*step ) {
            if ( detect_object(i,j) == true ) {
                locations[nlocations] = POINT(i,j);
                nlocations++;
            }
        }
    }
}
```

This uses a procedure called "detect_object" operating on a particular image location (i, j), the inner two loops representing a coarser sampling grid that is staggered by the index in the outer loop, so that all of the locations in the original finer sampling grid are covered. It may be noted that apart from a small overhead this algorithm requires almost no greater computational effort than the effort required to scan the finer grid in a single pass.

Figure 5:
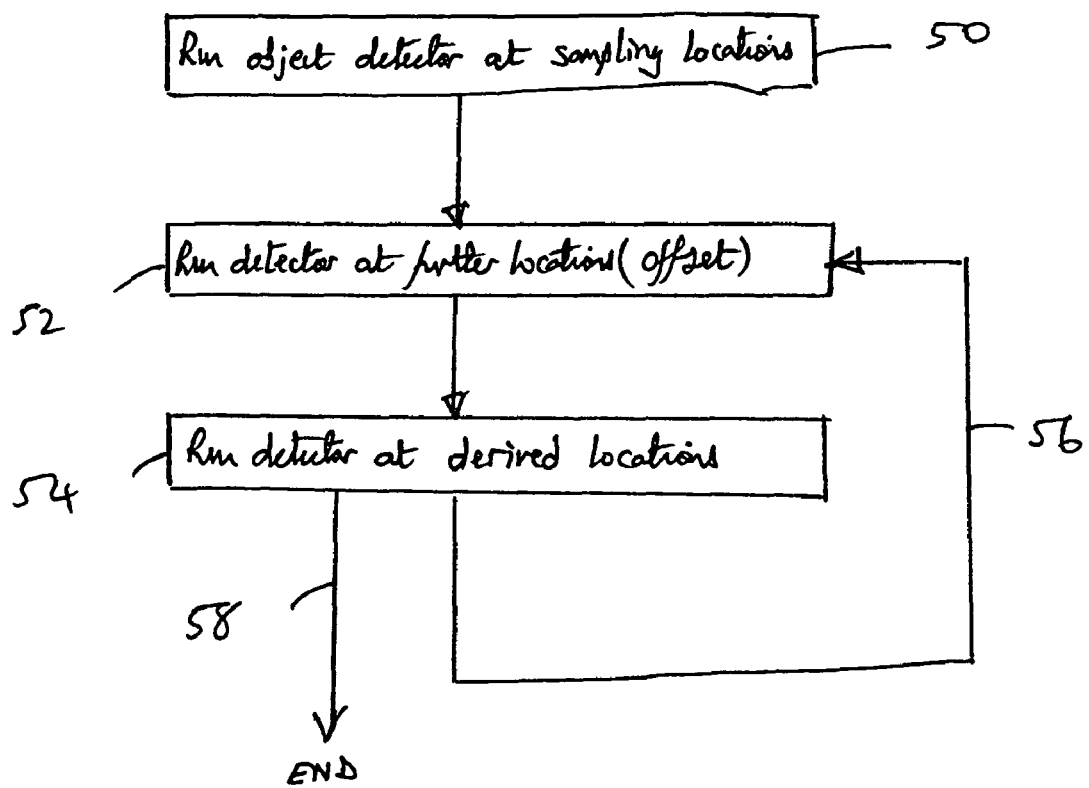
FIG. 5 is a flow diagram schematically illustrating a method.

The method is shown, schematically, in FIG. 5. At step 50, the object detector is first operated at a plurality of sampling locations, and a hit is recorded at each location where an object of interest is found. At step 52, the detector is then operated again at a further plurality of sampling locations defining a second grid spaced across a second frame. As shown at step 54, the detector is then operated in addition at one or more further locations on the second frame derived from the or each location on the first frame at which a hit was recorded. The order of the steps 52, 54 may be reversed, and it would also be possible for both of the steps to be undertaken simultaneously, assuming suitable parallel processing facilities were available.

On completion of the steps 52, 54, these two steps may be repeated (again, in either order) for a sequence of subsequent frames, with each respective sampling grid being offset from the grid used on the preceding frame. That is illustrated schematically in FIG. 5 by the arrow 56. The method completes at the end of the sequence of the video frames, as shown by the arrow 58.

Figure 4:
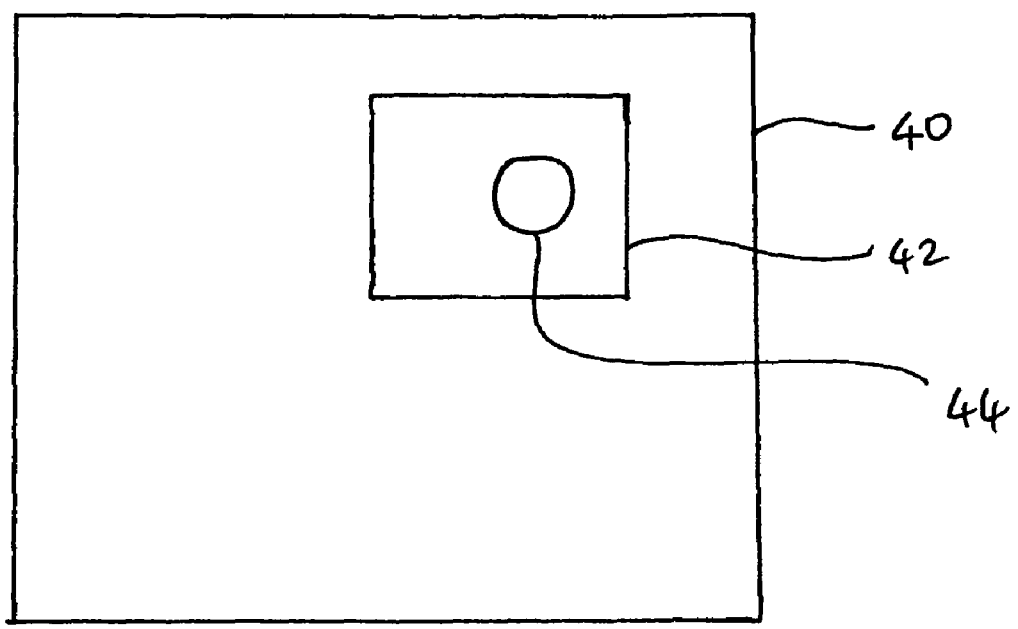
FIG. 4 schematically illustrates apparatus according to an embodiment of the invention.

In a practical implementation, the invention may be embodied within some hardware or apparatus, such as a still or video camera 40, shown schematically in FIG. 4. Within the camera 40 is a microprocessor chip or programmed digital computer 42, which is programmed to carry out the method as previously described. The computer, when operating in accordance with the stored program, embodies an object detector 44. It will be understood of course that instead of using a programmed digital computer, the object detector 44 could comprise a purpose designed hard coded or hard wired system.

The invention claimed is:

1. A method of tracking an object in a video stream comprising a plurality of video frames, the method comprising:
(a) running an object detector, on a computer, at a plurality of sampling locations, the locations defining a first grid spaced across a first video frame, and recording a hit, to electronic storage, at each location where an object of interest is found; and
(b) running the object detector, on the computer, at a further plurality of sampling locations defining a second grid spaced across a succeeding second video frame, the second grid being offset from the first grid, wherein larger points, which have a size of at least 2×2 points of a fine grained grid, cover the entire first grid and the entire second grid and wherein each of the larger points has one of the sampling locations of the first grid and one of the further sampling locations of the second grid and wherein each of the further sampling locations is offset with respect to a corresponding sampling location of the first grid for a respective larger point and simultaneously running the detector employing parallel processing, on the computer, in addition at one or more further locations on the second frame derived from each location on the first frame at which a hit was recorded.

2. A method of tracking an object in a video stream as claimed in claim 1 in which the further locations on the second frame are the same as the locations on the first frame at which the hit was recorded.

3. A method claimed as in claim 1 in which the further locations on the second frame are derived by carrying out a neighbourhood search around the locations on the first frame at which the hit was recorded.

4. A method claimed as in claim 1 in which the further locations are derived by predicting the movement of the or each object located on the first frame to one or more estimated locations in the second frame, the estimated locations being selected as the further locations.

5. A method claimed as in claim 1 in which the further locations are derived by predicting the movement of the or each object located on the first frame to one or more estimated location in the second frame, the further locations being chosen by carrying out a neighbourhood search around the estimated locations.

6. A method as claimed in claim 1 including repeating step (b) for a sequence of subsequent frames, each respective sampling grid being offset from the grid used on the preceding frame.

7. A method as claimed in claim 1 in which each time the object detector runs it attempts to find the object of interest at a plurality of different scales.

8. A method as claimed in claim 1 for operating on a real-time video stream, and in which the object detector operates in sub-real-time.

9. A method as claimed in claim 1 in which the object detector is a face detector.

10. Apparatus for tracking an object in a video stream comprising a plurality of video frames, the apparatus including an object detector comprising:
a computer that is programmed for
(a) running an object detector at a plurality of sampling locations, the locations defining a first grid spaced across a first video frame, and recording a hit, to electronic storage, at each location where an object of interest is found; and
(b) running the object detector at a further plurality of sampling locations defining a second grid spaced across a succeeding second video frame, the second grid being offset from the first grid, wherein larger points, which have a size of at least 2×2 points of a fine grained grid, cover the entire first grid and the entire second grid and wherein each of the larger points has one of the sampling locations of the first grid and one of the further sampling locations of the second grid and wherein each of the further sampling locations is offset with respect to a corresponding sampling location of the first grid for a respective larger point and simultaneously running the detector employing parallel processing in addition at one or more further locations on the second frame derived from each location on the first frame at which a hit was recorded.

11. Apparatus as claimed in claim 10 in which the further locations on the second frame are the same as the locations on the first frame at which the hit was recorded.

12. Apparatus as claimed in claim 10 in which the further locations on the second frame are derived by carrying out a neighbourhood search around the locations on the first frame at which the hit was recorded.

13. Apparatus as claimed in claim 10 in which the further locations are derived by predicting the movement of the or each object located on the first frame to one or more estimated locations in the second frame, the estimated locations being selected as the further locations.

14. Apparatus as claimed in claim 10 in which the further locations are derived by predicting the movement of the or each object located on the first frame to one or more estimated location in the second frame, the further locations being chosen by carrying out a neighbourhood search around the said estimated locations.

15. Apparatus as claimed in claim 10 further including repeating (b) for a sequence of subsequent frames, each respective sampling grid being offset from the grid used on the preceding frame.

16. Apparatus as claimed in claim 10 in which each time the object detector runs it attempts to find the object of interest at a plurality of different scales.

17. Apparatus as claimed in claim 10 for operating on the real-time video stream, and in which the object detector operates in sub-real-time.

18. Apparatus as claimed in claim 10 in which the object detector is a face detector.

19. Apparatus as claimed in claim 10, wherein a camera includes the apparatus.

* * * * *

UNITED STATES PATENT AND TRADEMARK OFFICE
CERTIFICATE OF CORRECTION

| | | |
|---|---|---|
| PATENT NO. | : 8,224,023 B2 | |
| APPLICATION NO. | : 11/490156 | |
| DATED | : July 17, 2012 | |
| INVENTOR(S) | : Darryl Greig | |

It is certified that error appears in the above-identified patent and that said Letters Patent is hereby corrected as shown below:

In column 6, line 21, in Claim 3, delete "claimed as" and insert -- as claimed --, therefor.

In column 6, line 25, in Claim 4, delete "claimed as" and insert -- as claimed --, therefor.

In column 6, line 30, in Claim 5, delete "claimed as" and insert -- as claimed --, therefor.

Signed and Sealed this
Twenty-ninth Day of January, 2013

David J. Kappos
*Director of the United States Patent and Trademark Office*